United States Patent [19]
Berner et al.

[11] Patent Number: 5,230,719
[45] Date of Patent: Jul. 27, 1993

[54] DEHUMIDIFICATION APPARATUS

[76] Inventors: Erling Berner, Loretohohe 5, CH-6300 Zug, Switzerland; Rolf E. Berner, R.D. #6, New Castle, Pa. 16103

[21] Appl. No.: 693,705

[22] Filed: May 6, 1991

Related U.S. Application Data

[63] Continuation-in-part of Ser. No. 523,612, May 15, 1990, Pat. No. 5,050,667.

[51] Int. Cl.⁵ .............................................. B01D 53/04
[52] U.S. Cl. .................................... 55/208; 55/33; 55/387; 165/4; 165/97
[58] Field of Search ................. 55/32, 33, 387, 208; 165/97, 4

[56] References Cited

U.S. PATENT DOCUMENTS

| | | | |
|---|---|---|---|
| 4,699,635 | 10/1987 | Norback | 55/33 |
| 4,952,283 | 8/1990 | Besilo | 165/97 |
| 5,055,667 | 9/1991 | Berner | 165/4 |

FOREIGN PATENT DOCUMENTS 171647  6/1960  Sweden .................. 55/33

OTHER PUBLICATIONS

DST Sorptionsteknik AB, *Dehumidification and Cleaning of Air*, date 1986, p. 2, place of publication believed to be Sweden.

*Primary Examiner*—Albert W. Davis, Jr.
*Attorney, Agent, or Firm*—Kirkpatrick & Lockhart

[57] ABSTRACT

An apparatus and method for dehumidifying air includes a duct with at least four ports, two at each end. The ports are regulated by valves that are biased in the closed position. A desiccant containing matrix is disposed within the duct. One or more fans are adapted to produce substantially axial air flow in two directions through the duct: a first direction during a regeneration phase of the dehumidifying cycle and a second direction during a process phase of the dehumidifying cycle. In the process direction, air from the enclosure enters one end of the duct, passes through the desiccant containing matrix where moisture is absorbed by the matrix and exits through the opposite end of the duct back to the enclosure. The air is thus at a lower relative humidity when it leaves the apparatus. Upon reversal of the air flow direction, the air is drawn into the duct from a source outside the enclosure, heated by a heater, passed through the desiccant containing matrix where moisture is absorbed from the matrix and exits through the opposite duct back into the source of air. The air is thus at a higher relative humidity when it is exhausted from the apparatus.

12 Claims, 6 Drawing Sheets

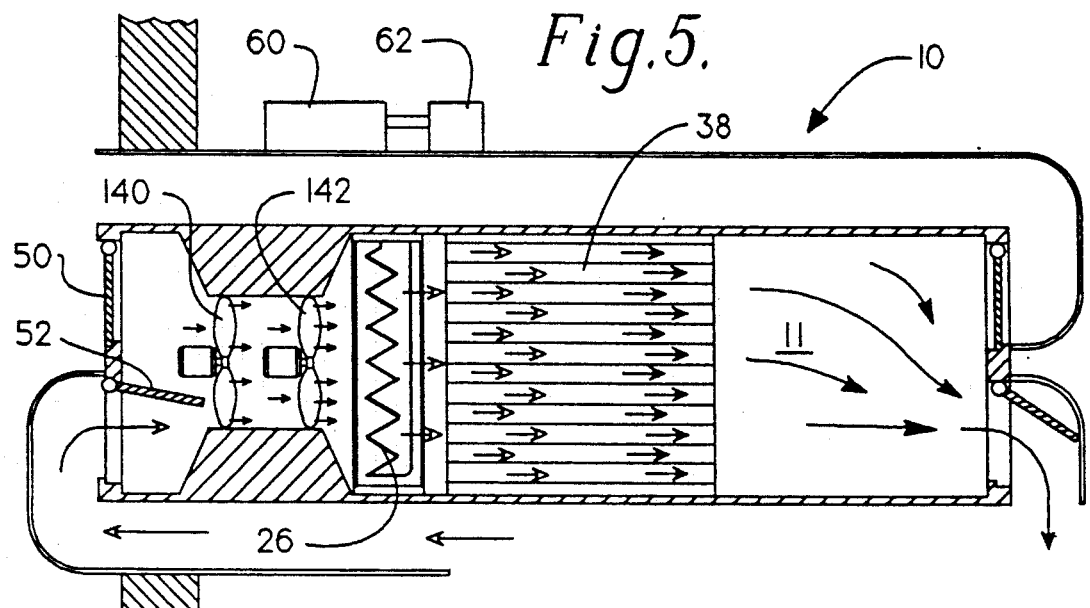
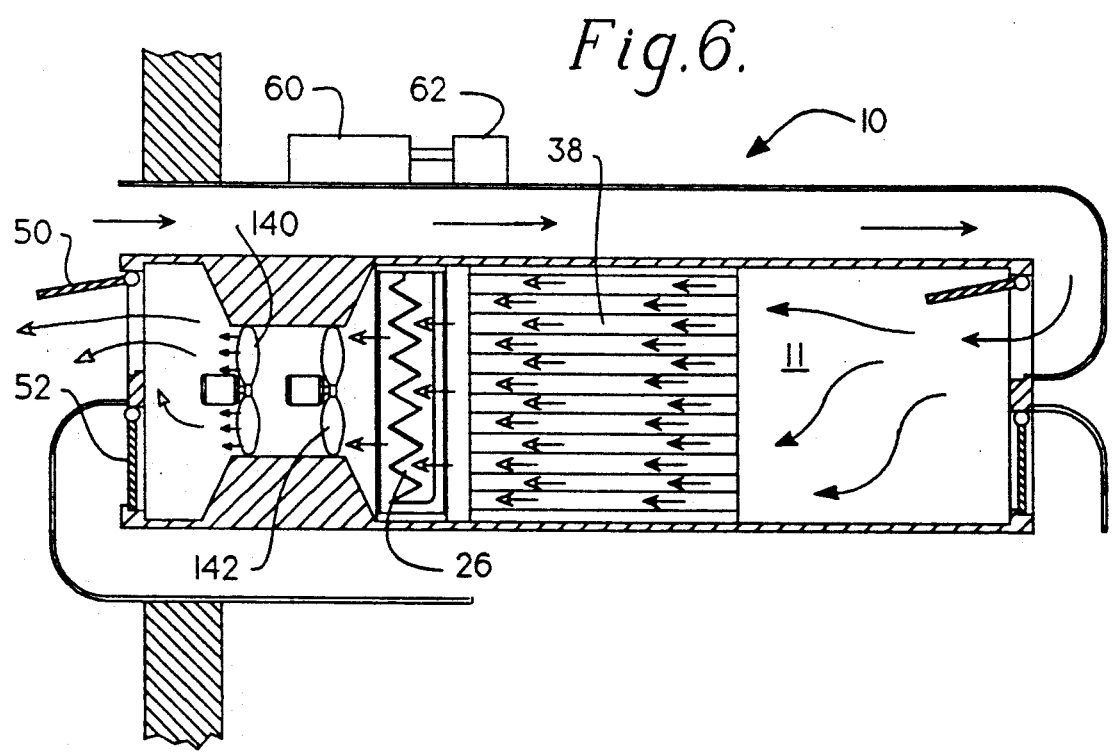

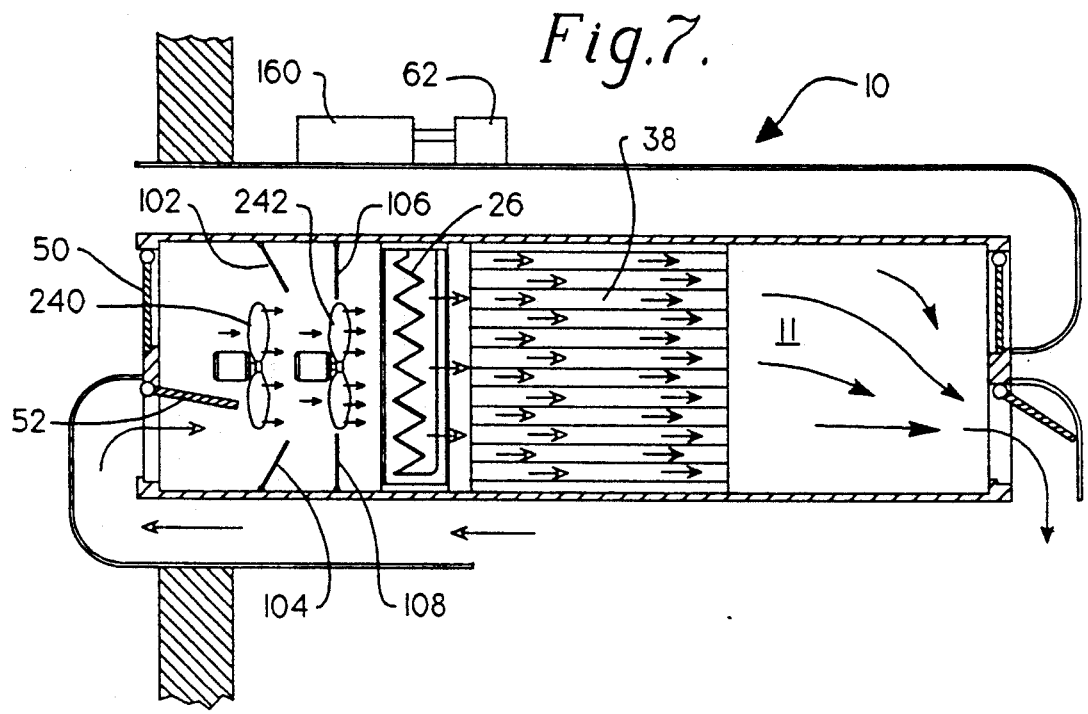
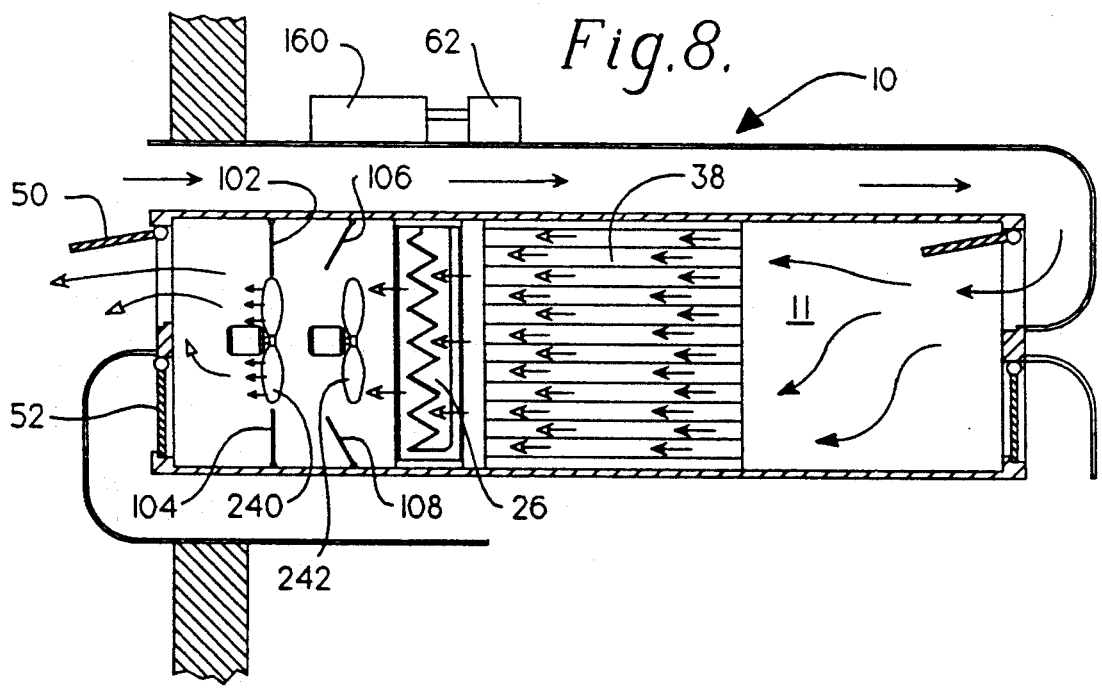

DEHUMIDIFICATION APPARATUS

This is a continuation-in-part of copending U.S. patent application Ser. No. 7/523,612 filed on May 15, 1990 now U.S. Pat. No. 5,050,667 granted Sep. 24, 1991.

BACKGROUND OF THE INVENTION

1. Field of the Invention

This invention relates to an apparatus for dehumidifying air within an enclosure.

2. Description of the Invention Background

Apparatus for dehumidifying air within an enclosure are known for use in reducing the moisture content of air within an enclosure. There are several reasons why it is desirable to reduce the moisture content of the air. For example, in certain industrial operations such as the manufacture of integrated circuits, it is desirable to maintain the air within the manufacturing facility at a low relative humidity. Additionally, in warehouses which store material subject to corrosion, it has been found that a lower relative humidity within the warehouse inhibits the corrosion of the materials. Dehumidifiers are also desirable for use in homes where the occupants find it more comfortable when the relative humidity has been reduced. In connection with air conditioning the energy costs can be minimized through the use of a dehumidifier.

In the past, dehumidifiers have been complex apparatus having rotating desiccant containing matrices or having compressors utilizing refrigerants. Dehumidifiers of the rotating matrix type have two air streams flowing in opposite directions through the dehumidifier at the same time. One air stream, a process stream, enters the duct from an enclosure, passes through part of the desiccant containing matrix, gives up its moisture to the matrix, and exits the duct back into the enclosure. A second air stream, a regeneration stream, enters the duct from outside the enclosure, passes through another part of the desiccant containing matrix, picks up moisture stored in that part of the matrix (by virtue of previous exposure to a process air stream), and exits the duct back into the source of air which is outside the enclosure. While both of these streams of air are continuously flowing through the desiccant containing matrix, the matrix is slowly rotating to expose to the process stream that portion of the matrix which has been dried by the regeneration stream. The portion of the matrix exposed to the process stream must be sealed from the portion of the matrix exposed to the regeneration stream if the matrix is to be dried by the regeneration stream. However, due to the rotation of the matrix, it is extremely difficult to maintain a seal between the two portions of the matrix. Such dehumidifiers are exemplified by complex duct work and many moving parts. An example of such a dehumidifier can be found in U.S. Pat. No. 4,134,743 to Macriss et al. Another problem with ducts used for dehumidifiers is that bacteria can grow inside the ducts and can be blown into the room. Therefore, a need exists for a dehumidifier which has a minimum of moving parts, is compact and relatively inexpensive to manufacture, and which can be easily cleaned and serviced. The need also exists for a dehumidifier having a duct with a minimal amount of curves or bends to eliminate places where bacteria can grow.

BRIEF SUMMARY OF THE INVENTION

The present invention combines in a single, relatively compact housing the necessary components to efficiently dehumidify air within an enclosure with the assistance of an air source outside of the enclosure. The apparatus includes a duct with at least four ports, two at each end. The ports are regulated by valves that are biased in the closed position.

A desiccant containing, fixed matrix is disposed within the duct. Also disposed within or without the duct is a fan which is adapted to produce substantially axial air flow through the duct. The fan is further adapted to produce air flow in two directions through the duct: a first direction during a regeneration phase of the dehumidifying cycle and a second direction during a process phase of the dehumidification cycle.

In the process phase or direction, air enters one end of the duct, passes through the desiccant containing matrix and exits through the opposite end of the duct. As the air passes through the desiccant containing matrix, moisture is absorbed by the desiccant which is preferably silicon gel or lithium chloride. The air is thus at a lower relative humidity when it exits the duct.

In the regeneration phase or direction, the direction of air flow within the duct is reversed. Air is drawn into the duct from a source outside the enclosure, heated by a heater and passed through the desiccant containing matrix. The heated air removes moisture from the desiccant during such passage. After passing through the matrix, the air, having a higher relative humidity, exits the duct through a port in the opposite end of the duct back into the source of air outside the enclosure.

The air flow direction through the duct may be reversed by changing the orientation of the fan by rotating the fan about an axis perpendicular to the axis of rotation of the fan blades. Alternatively, the air flow may be reversed by interrupting rotation of the fan blades and reversing their direction of rotation. The dehumidification process thus occurs utilizing a stationary desiccant containing matrix thereby avoiding the problems associated with dehumidifiers of the rotating matrix type. These and other advantages and benefits of the present invention will become apparent from the Description of a Preferred Embodiment hereinbelow.

The means for heating the air is preferably a filament heater having a relatively small mass. In this embodiment, the heater may be switched off in the process phase and, due to its small mass, will not import any significant heat to air passing it during the process phase.

The valves are preferably made of a resilient material, such as a polyethylene terephthalate which is available under the trademark MYLAR (of E.I. DuPont DeNemours). Such material has the property of being easily deformable when a slight force is applied to it and returning to its original shape when the force is removed. In the case of a MYLAR material, the preferred thickness is about 0.007 inches (0.175 mm) so that the valve may be deflected by an air flow directed against it in a direction that would permit the material to deform by bending, but, upon reversal of the air flow, the valve will return to its original shape (i.e. flat) and thereby close against its seat. Another possible construction of the valve is described in U.S. Pat. No. 4,744,409 to Erling Berner.

In some applications the ports may be divided into several smaller ports which reduces the noise produced when the valves close. One skilled in the art will recognize that the valves can be constructed in several ways. For example, the valves could be spring biased in the closed position by either a coil or leaf spring. The valves could also be constructed so that they are biased in the closed position by their own weight.

DESCRIPTION OF THE DRAWINGS

For the present invention to be clearly understood and readily practiced, preferred embodiments will now be described, by way of example only, with reference to the accompanying figures wherein:

FIG. 5 is a diagrammatic representation of another embodiment of the dehumidification apparatus of the present invention in the regeneration phase;

FIG. 6 is a diagrammatic representation of the dehumidification apparatus of FIG. 5 in the process phase;

FIG. 7 is a diagrammatic representation of another embodiment of the dehumidification apparatus of the present invention in the regeneration phase;

FIG. 8 is a diagrammatic representation of the dehumidification apparatus of FIG. 7 in the process phase;

DESCRIPTION OF A PREFERRED EMBODIMENT

FIGS. 1-12B illustrate preferred embodiments of the present invention.

Figure 1:
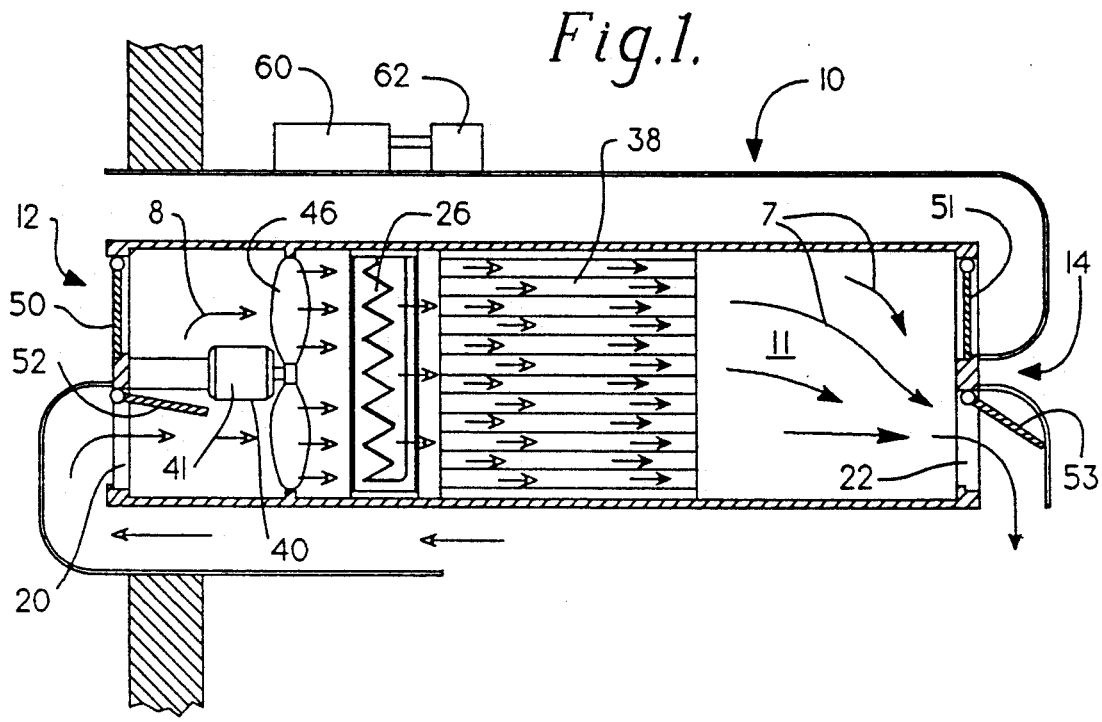
FIG. 1 is a diagrammatic representation of the dehumidification apparatus of the present invention in the regeneration phase.
Figure 2:
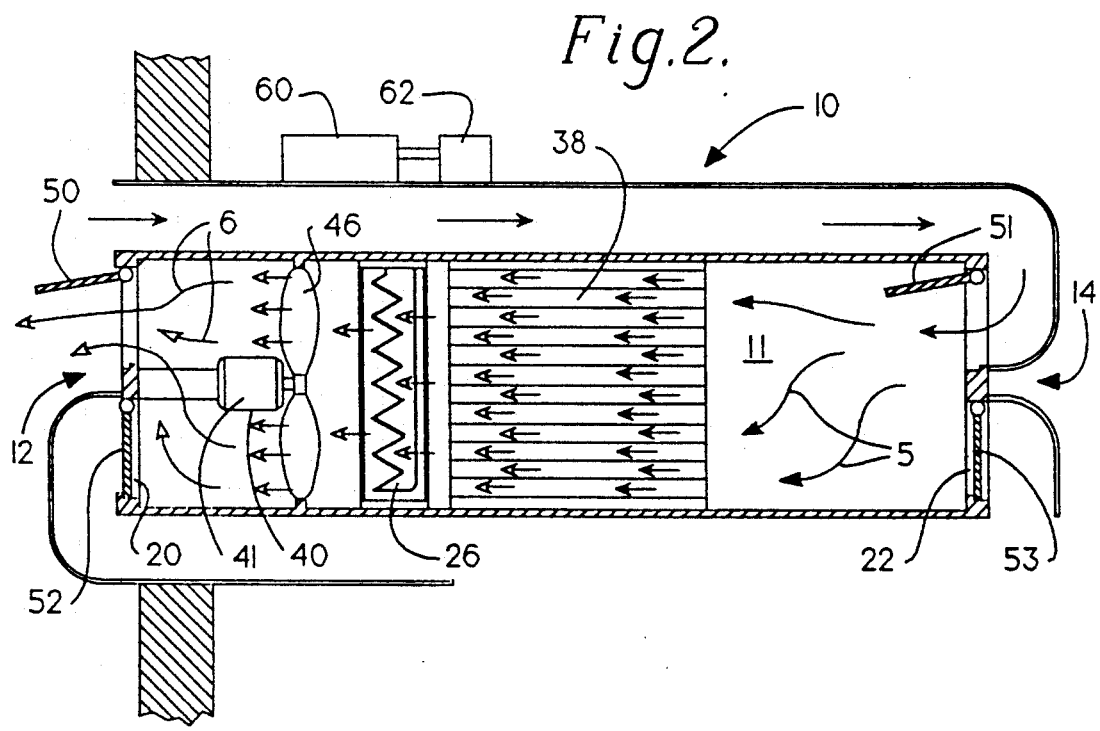
FIG. 2 is a diagrammatic representation of the dehumidification apparatus of the present invention in the process phase.

Referring to FIGS. 1 and 2, the dehumidification apparatus 10 of the present invention includes a cylindrical duct 11, as seen in FIG. 1, which preferably is straight and has openings at a first end 12 and a second end 14. The duct can be made of any suitable material such as steel or aluminum and is insulated where the hot reactivation air is passing through.

Disposed within the duct 11 is a desiccant containing matrix 38, which will retain the moisture in the process air. The desiccant containing matrix 38 consists of a heat resistant material as the temperature normally will be kept at 140° C. (284° F.) or higher during the reactivation phase depending upon what type desiccant is used. A ceramic type material is preferable as it can easily be combined with adsorption type desiccants (silicagel, molecular sieves, etc.) as well as with absorption type desiccants (such as lithium chloride). Metals such as steel or aluminum can also be used but they must be coated with a high temperature resisting adhesive which can bond to the surface of the metal, the adsorption type materials or a high temperature resistant material which can absorb the absorption material.

The matrix 38 is constructed by rolling corrugated material into a cylinder so that the corrugations form axial passageways through the desiccant containing matrix 38 for air to flow therethrough. The corrugated material has a flat backing material attached. The matrix 38 can also be formed into a square if desired. The desiccant containing matrix 38 is fixedly held inside the duct 11 by the frictional contact with the duct 11 and may be easily removed from the duct 11 by application of force to one end of the matrix 38 thereby forcing the matrix 38 out of the duct 11. The desiccant in the matrix will retain moisture contained in the process air.

Adjacent to the desiccant containing matrix 38 in the duct 11 is a fan 40 which produces a substantially axial air flow. The fan could also be located outside of the duct but is shown within the duct for illustration purposes. The fan is comprised of an electric motor 41 and a plurality of blades 46. One feature of the invention, which will become apparent below, is the fact that if desired, only one fan can be required in the dehumidifying apparatus 10. The fan serves to produce substantially axial air flow in two directions, a first (regeneration) direction from the first end 12 to the second end 14 and a second (process) direction from the second end 14 to the first end 12. As shown in FIGS. 1 and 2 air flow is reversed by means of a control circuit 60 which is powered by a power source 62. The control circuit 60 is connected to the fan by leads (not shown). The control circuit changes the polarity of the voltage applied to the motor 41 thereby reversing the direction of rotation of the fan blades 46. It is well within the skill of one having ordinary skill in the art to design such a circuit to accomplish the desired result of reversing the fan blade rotation direction. The fan 40 can be any type suitable for producing the desired air flow such as the axial type or centrifugal type and should be sized to be capable of moving the desired volume of air. The speed of rotation of the fan can vary between for the regeneration and process phases.

As shown in FIGS. 1 and 2, one way check valves 50 and 52 are pivotally connected to the first end 12 of the duct 11 and one way check valves 51 and 53 are pivotally connected to the second end 14 of the duct 11. The operation of one way check valves 50, 51, 52 and 53 will be described hereinbelow.

Completing the description of FIGS. 1 and 2, a heater 26 is provided. The heater 26 is preferably of the electric filament type having a relatively small mass so that it cools quickly when the current to the filament is interrupted. Because of the filament's small mass, little heating of the air occurs during the process phase. The heater 26 is typically energized by the control circuit 60 through a lead (not shown). The heater is grounded by another lead (not shown). The control circuit 60 energizes the heater 26 during the regeneration phase and de-energizes the heater 26 during the process phase. It is well within the skill of one having ordinary skill in the art to construct a control circuit to accomplish this result. The heater 26 is removably held in the duct 11 by any suitable means such as screws or bolts (not shown).

Figure 3:
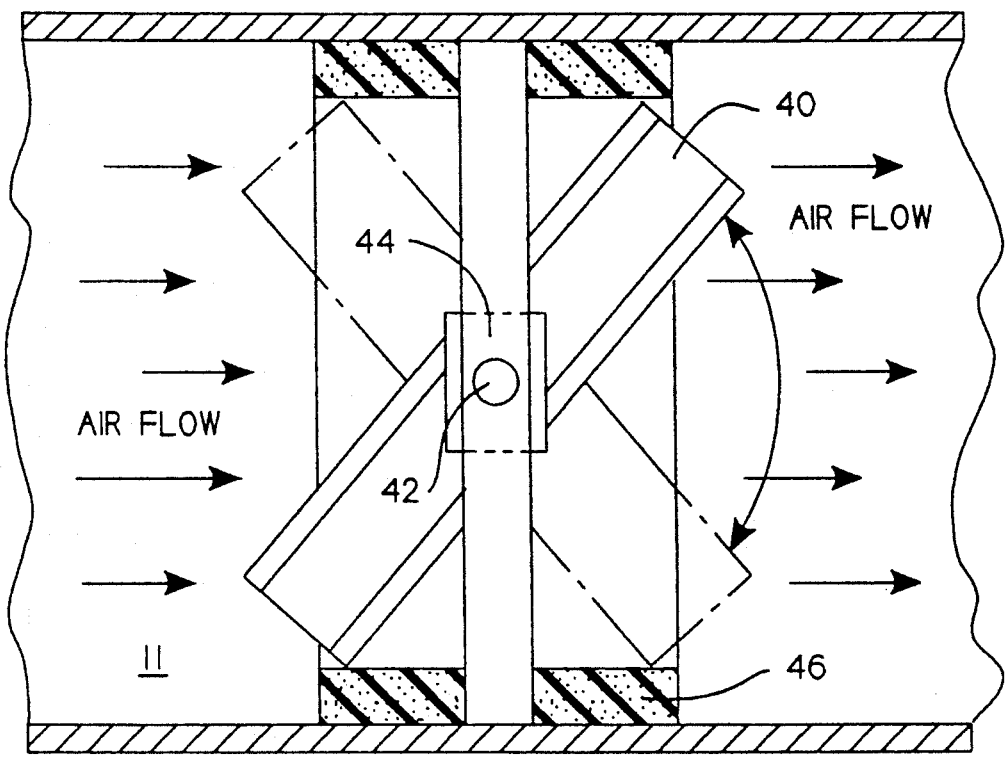
FIG. 3 is a view of the fan in a second embodiment of the present invention in the regeneration phase.
Figure 4:
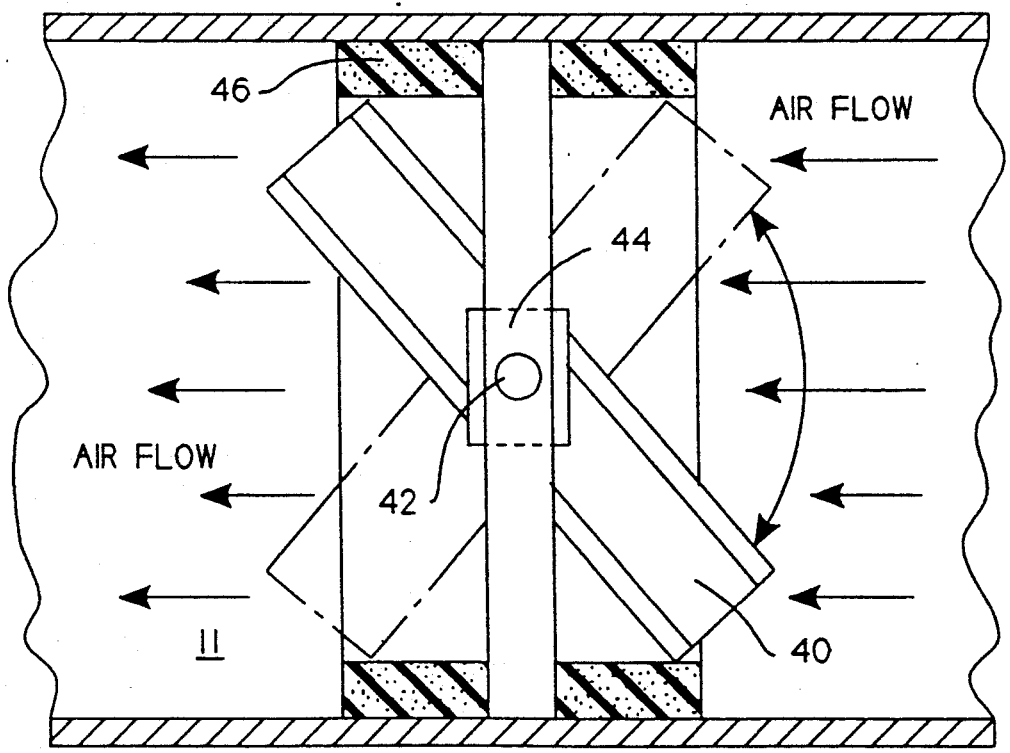
FIG. 4 is a view of the fan in the second embodiment of the present invention in the process phase.
Figure 9:
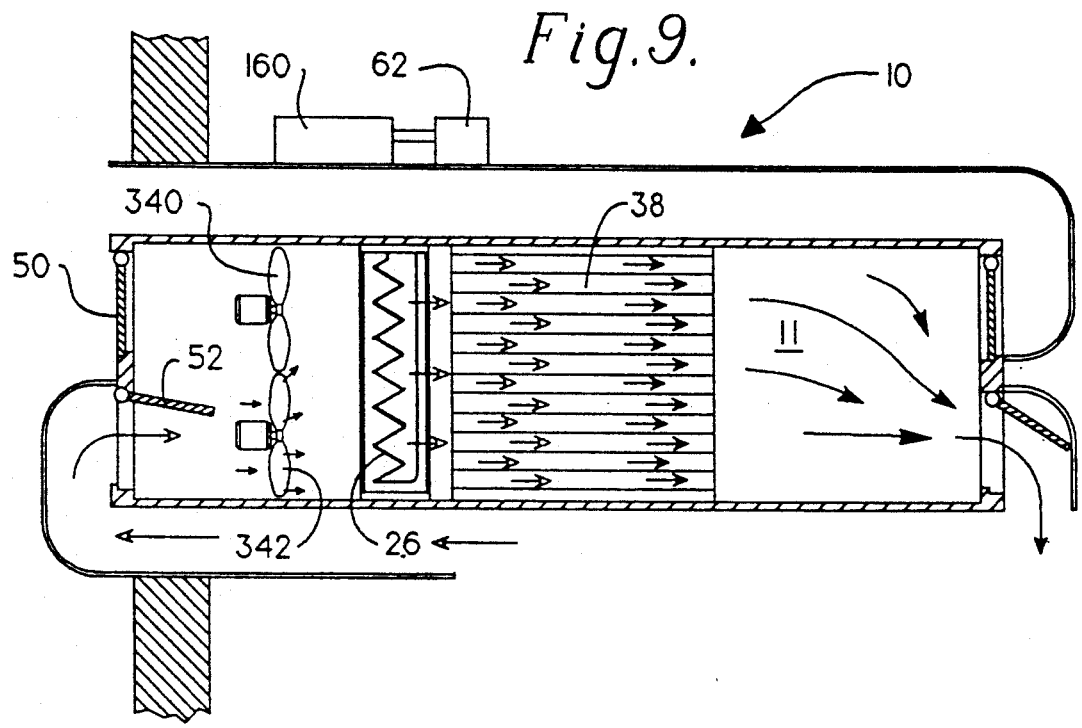
FIG. 9 is a diagrammatic representation of another embodiment of the dehumidification apparatus of the present invention in the regeneration phase.
Figure 10:
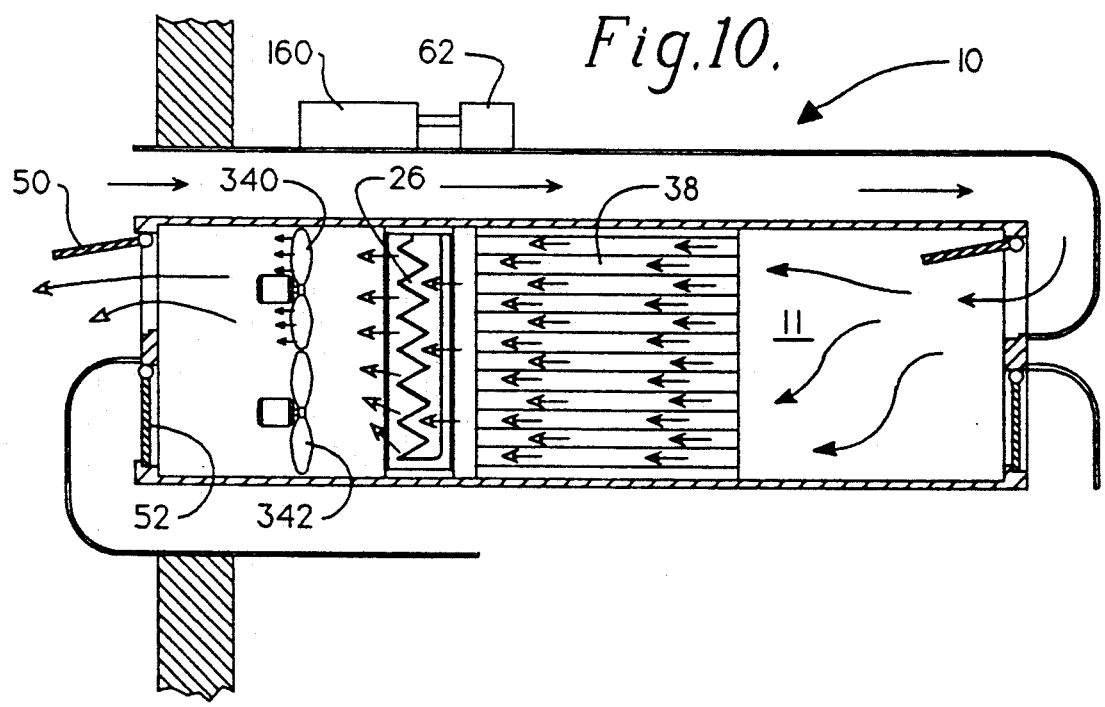
FIG. 10 is a diagrammatic representation of the dehumidification apparatus of FIG. 9 in the process phase.

In another embodiment, as shown in FIGS. 3 and 4, the fan 40 is pivotally mounted by means of a pin 42 and a solenoid 44 for rotation about an axis transverse to the duct 11 so that the fan may direct air toward first end 12 or second end 14. The solenoid 44 is controlled by a timer (not shown) which energizes the solenoid 44 at a desired time interval. When the solenoid 44 is energized, it changes the position of the fan 40 from the position shown FIG. 3 to that shown in FIG. 4 thereby reversing the direction of the air flow. When the solenoid 44 is de-engerized, the fan 40 returns to the position shown in FIG. 3. The rotation can be through any angle sufficient to reverse the air flow, such as ninety degrees i.e. as shown in FIGS. 3 and 4, but the angle is preferably about one hundred eighty degrees, in order to maximize air flow conditions within the duct.

The pivoting movement of the fan 40 is in each direction limited by abutments 46 which seal the rim of the fan to the inside of duct in order to maximize air flow within the duct. Preferably, the air flow is reversed every 0.5–5 minutes, although any appropriate time interval may be chosen. The solenoid is of the rotating type and when energized rotates the fan to reverse the air flow. The solenoid 44 and fan 40 may be connected to duct 11 in any convenient manner. For example, the solenoid 44 and fan 40 may be connected to duct 11 by a pin (not shown) which is exposed through an access hole (not shown) in the duct. By pushing the pin into the duct 11, the solenoid and fan can be removed from the duct 11.

In a third embodiment as shown in FIGS. 5–10, two fans are disposed within the duct. The fans can be placed adjacent one another sharing the same axis of rotation, as shown as fans 140 and 142 in FIGS. 5 and 6. The fans can be separated from one another sharing the same axis of rotation as shown as fans 240 and 242 in FIGS. 7 and 8. Finally, the fans can be placed adjacent one another along the transverse axis as shown as fans 340 and 342 in FIGS. 9 and 10. In embodiments where two fans are used, a control circuit 160 is used to selectively energize and de-energize the fans at preselected intervals. When one fan is producing air flow in one axial direction through the apparatus 10, the other fan is de-energized so that the rotation of its blades ceases. After a preselected period of time has elapsed, the first fan is de-energized by the control circuit 160 so that its blades cease to rotate and the second fan is energized by the control circuit 160 thus producing air flow in the opposite axial direction through the apparatus 10. In the apparatus as shown in FIGS. 7 and 8, two additional pairs of flapper valves 102, 104, 106 and 108 are disposed within the duct 11, one pair 102 and 104 surrounding the first fan 240 and another pair 106 and 108 surrounding the second fan 242. These valves increase the efficiency of the fans by directing the air flow to the fan which is energized.

Figure 11A:
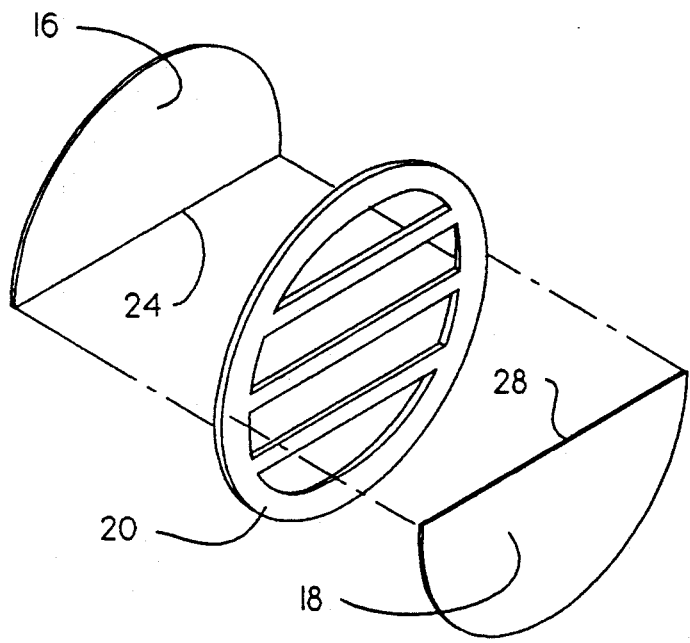
FIG. 11A is a perspective view of one embodiment of an end piece of the present invention.
Figure 11B:
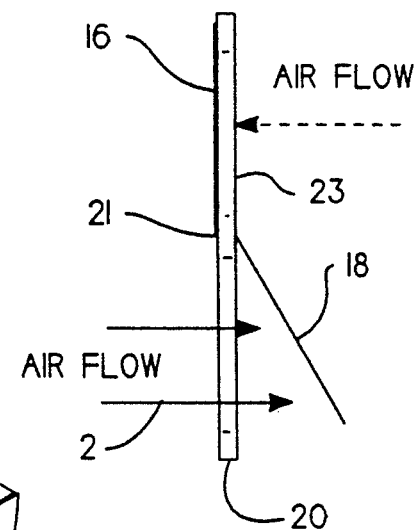
FIG. 11B is a side view of the end piece of FIG. 11A.
Figure 12A:
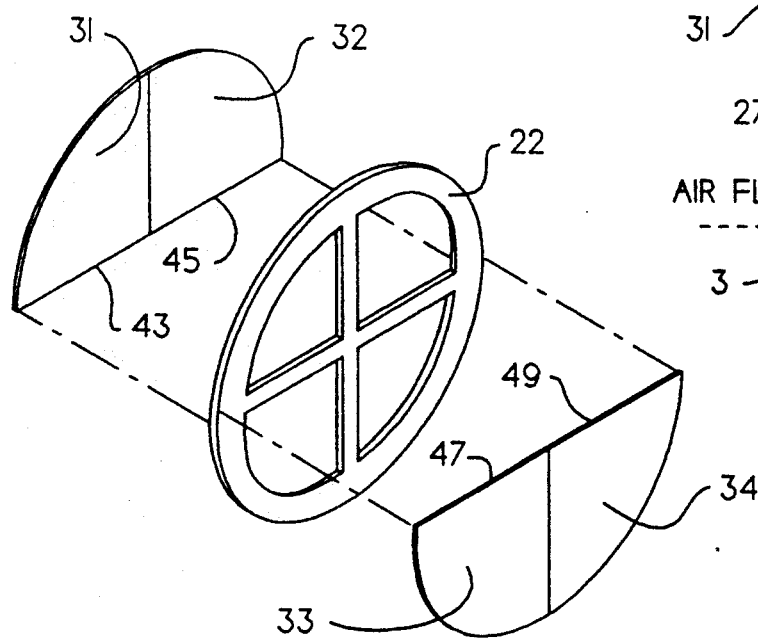
FIG. 12A is a perspective view of another embodiment of the other end piece of the present invention.

Referring now to FIGS. 11A, 11B, 12A and 12B, the first end 12 and second end 14 of the duct 11 have end pieces 20 and 22, respectively. In one embodiment of the invention, the first end 12 and second end 14 comprise annular rings having openings therethrough as seen in FIGS. 11A and 12A, respectively. It will be understood by one skilled in the art that the openings can be of various geometries and are shown as horizontal slots in FIG. 11A and as quarter circles in FIG. 12A for illustration purposes only. In some applications it is desired to have several smaller openings so that the flaps discussed hereinbelow will produce less noise on their closing.

Figure 12B:
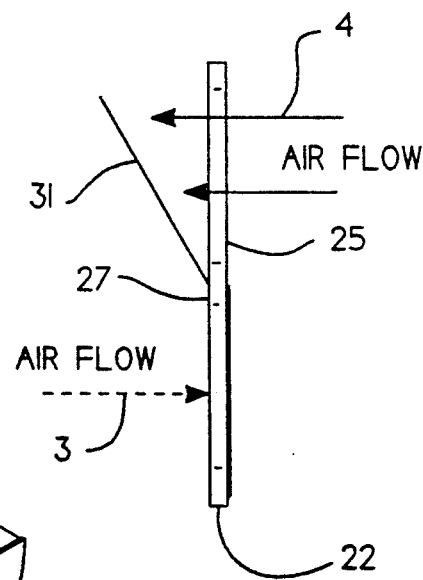
FIG. 12B is a side view of the end piece of FIG. 12A.

The end piece 20 has an outside surface 21 and an inside surface 23 (FIG. 11B). Similarly, the end piece 22 has an outside surface 25 and an inside surface 27 (FIG. 12B). As seen in FIGS. 11A and 11B, the openings of the end piece 20 are covered by two flexible flaps, an upper flap 16 and a lower flap 18. The upper flap 16 has an attachment edge 24. The attachment edge 24 is connected horizontally across the diameter of the outside surface 21 of the end piece 20 so that air flowing in the direction of arrow 1 in FIG. 11B will push the upper flap 16 outward causing it to bend away from the end piece 20 so that the air may flow through the opening in the end piece 20; however, such flow will bear against lower flap 18 thereby further urging the flap into its normally closed position. The lower flap 18 also has an attachment edge 28 which is connected horizontally across the diameter of the inside surface 23 of the end piece 20, as seen in FIG. 11B. When air flows in the direction of arrow 2 in FIG. 11B, the lower flap 18 bends inward so that air may flow through the opening in the end piece 20, but air flow in the direction of arrow 2 will bear against upper flap 16 thereby further urging the flap into its normally closed position.

The end piece 22 as seen in FIGS. 12A and 12B has quarter circular flaps 31, 32, 33 and 34 which operate in a similar manner as flaps 16 and 18 of the end piece 20. Flaps 31 and 32 are attached along horizontal edges 43 and 45 to the inside surface 27. Flaps 33 and 34 are attached along horizontal attachment edges 47 and 49 to the outside surface 25. When air is flowing in the direction of arrow 3 in FIG. 12B, the flaps 33 and 34 bend away from the end piece 22 to allow air to exit from the apparatus. When the air flow is reversed, and flows in the direction of arrow 4 in FIG. 12B, the flaps 31 and 32 bend away from the end piece 22 and allow air to enter the apparatus through the end piece 22.

In operation, the dehumidifying apparatus has two phases: a process phase and a regeneration phase. In FIGS. 1 and 2, arrows 5 and 7 having dark arrowheads represent air having a relatively high moisture content and arrows 6 and 8 having a light arrowhead represent air having a relatively low moisture content. During the process phase (FIG. 2), the fan 40 is adapted to provide air flow from end 14 to end 12. Air is drawn from the enclosure, in the direction of arrow 5 in FIG. 2, through the end piece 22, by the fan 40. The flow of air pushes open one way check valve 51 and forces closed one way check valve 53. The air passes through the desiccant containing matrix 38 and gives up its moisture to the desiccant containing matrix 38. After passing through the desiccant containing matrix 38, the air flows out through the end piece 20 in the direction of arrow 6 in FIG. 2 and returns to the enclosure. The flow of air pushes open one way check valve 50 and forces closed one way check valve 52. During this phase, the heater 26 is de-engerized. When a preselected period of time elapses, the air flow is reversed, thus placing the apparatus in the regeneration phase.

In the regeneration phase (FIG. 1), the fan 40 is adapted to provide air flow from end 12 to end 14. Air is drawn from the outside of the enclosure or apparatus 10 through the end piece 20 in the direction of the arrow 8 in FIG. 1 by the fan 40. The flow of air pushes open one way check valve 52 and pushes closed one way check valve 50. The air passes through the fan 40 and is heated by the heater 26, which is energized during the regeneration phase. The air passes through the desiccant containing matrix 38 where it picks up the moisture which was absorbed during the process phase. The air passes through the end piece 22 in the direction of arrow 7 in FIG. 1, and back out to the source of air outside apparatus 10. The flow of air pushes open one way check valve 53 and pushes closed one way check valve 51.

As discussed above, air flow reversal can be accomplished by either changing the position of the fan so that flow is reversed as shown in FIGS. 3 and 4, by reversing the rotational direction of the fan blades as shown in FIGS. 1 and 2 or by stopping rotation of one fan and starting rotation of the other fan as shown in FIGS. 5-10. Because the flow of air is reversed through the entire matrix 38, the need for a rotating matrix to achieve regeneration is completely eliminated. Also eliminated are the complex ducting, seals, and mechanism for rotating the matrix found in the prior art.

The ratio time during which the air flow is running in the generation phase and in the reverse direction according to FIG. 2 (process of dehumidification phase) is adjustable in dependence on the degree of humidity and dehumidification. The preselected periods of air flow and reverse flow can also be dependent on temperature, relative humidity of the air inside and outside the enclosure and fan speed, also the preselected energy of the heater depends on the selected values of the other operation features. We have found that a ratio of 2:1 to 3:1 of process to regeneration time works well and is preferable under many conditions. While the present invention has been described in conjunction with preferred embodiments, many modifications and variations will be readily apparent to those of ordinary skill in the art. This disclosure and the following claims are intended to cover such modifications and variations.

What we claim is:

1. Apparatus for dehumidifying air within an enclosure comprising:
   a duct having a first end and a second end;
   a desiccant-containing matrix disposed stationarily within said duct;
   means for heating air within said duct;
   means for producing substantially axial air flow within said duct in a first direction from said first end to said second end during a regeneration phase and in a second, opposite direction within said duct from said second end to said first end during a process phase;
   a first pair of one way valves, each disposed at an opposite end of said duct and being biased in the closed position, said first pair of valves being actuatable to the open position by air flow in said duct during said regeneration phase for admitting air to said duct from an outside source and exhausting said air to said outside source;
   a second pair of one way valves, each disposed at an opposite end of said duct and being biased in the closed position, and said second pair of valves being actuatable to the open position by air flow in said duct during the process phase for admitting air to said duct from said enclosure and exhausting said air back to said enclosure; and
   means for alternating said air flow within said duct between said first and second directions.

2. The apparatus of claim 1 wherein said means for producing substantially axially air flow is a single fan.

3. The apparatus of claim 2 wherein said means for alternating said air flow comprises a solenoid for rotating said fan to reverse the direction of air flow.

4. The apparatus of claim 1 wherein said means for heating the air comprises an electric heater.

5. The apparatus of claim 3 further comprising means for inactivating the electric heater when said apparatus is in said process phase and means for activating said electric heater when said apparatus is in said regeneration phase.

6. The apparatus of claim 2 wherein said fan and said desiccant containing matrix are removably held in the duct.

7. The apparatus of claim 3 wherein said fan, said desiccant containing matrix and said solenoid are removably held in the duct.

8. The apparatus of claim 3 wherein said fan, said desiccant containing matrix and said electric heater are removably held in the duct.

9. The apparatus of claim 1 wherein said means for producing substantially axial air flow comprises at least one fan adapted to produce air flow in one axial direction and at least one fan adapted to produce air flow in the opposite axial direction.

10. The apparatus of claim 1 wherein said means for producing substantially axial air flow comprises at least one fan within said duct.

11. The apparatus of claim 9 wherein said means for alternating said air flow comprises a control circuit for selectively energizing said fans.

12. Apparatus, for dehumidifying air within an enclosure comprising:
    a duct having a first end and a second end;
    a desiccant-containing matrix, having a first end and a second end, disposed stationarily within said duct;
    means for producing air flow within said duct in a first direction from said first end of said desiccant-containing matrix to said second end of said dessicant-containing matrix during a regeneration phase and in a second, opposite direction within said duct from said second end of said desiccant-containing matrix to said first end of said desiccant-containing matrix during a process phase;
    a first pair of valves, each disposed at an opposite end of said duct and being biased in the closed position, said first pair of valves being actuatable to the open position by air flow in said duct during said regeneration phase for admitting air to said duct and exhausting said air to an outside source;
    a second pair of valves, each disposed at an opposite end of said duct and being biased in the closed position, and said second pair of valves being actuatable to the open position by air flow in said duct during the process phase for admitting air to said duct from said enclosure and exhausting said air back to said enclosure;
    means for heating air within said duct in said regeneration phase prior to said air passing through said desiccant-containing matrix; and
    means for alternating said air flow within said duct between said first and second directions.

* * * * *